United States Patent
Duo

(10) Patent No.: US 11,438,963 B2
(45) Date of Patent: *Sep. 6, 2022

(54) METHOD FOR PROVIDING AN ELASTIC CONTENT FILTERING SECURITY SERVICE IN A MESH NETWORK

(71) Applicant: SonicWALL Inc., Milpitas, CA (US)

(72) Inventor: Zhuangzhi Duo, Fremont, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,388

(22) Filed: Dec. 3, 2020

(65) Prior Publication Data

US 2021/0160962 A1 May 27, 2021

Related U.S. Application Data

(63) Continuation-in-part of application No. 16/397,951, filed on Apr. 29, 2019, now Pat. No. 11,310,665.

(Continued)

(51) Int. Cl.
*H04W 84/18* (2009.01)
*H04W 40/24* (2009.01)
*H04W 40/12* (2009.01)

(52) U.S. Cl.
CPC .......... *H04W 84/18* (2013.01); *H04W 40/12* (2013.01); *H04W 40/246* (2013.01)

(58) Field of Classification Search
CPC .... H04W 84/18; H04W 40/246; H04W 40/12
See application file for complete search history.

(56) References Cited

U.S. PATENT DOCUMENTS

| 7,711,605 B1 * | 5/2010 | Santeufemia | ...... G06Q 30/0603 705/26.5 |
| 8,108,933 B2 * | 1/2012 | Mahaffey | .............. G06F 21/577 726/25 |

(Continued)

OTHER PUBLICATIONS

U.S. Appl. No. 17/111,391, filed Dec. 2, 2020, Method for Providing an Elastic Content Filtering Security Service in a Mesh Network.

(Continued)

*Primary Examiner* — Viral S Lakhia
(74) *Attorney, Agent, or Firm* — Polsinelli LLP

(57) ABSTRACT

The present disclosure distributes processing capabilities throughout different nodes in a wireless network. Methods and apparatus consistent with the present disclosure increase the efficiency of communications in a wireless network because they help minimize the need to forward communications to other nodes in the network. Apparatus and methods consistent with the present disclosure perform a function of elastic content filtering because rating information may be stored in different memories of different mesh nodes according to rules or profiles associated with a wireless mesh network as responses to requests are sent back along a route in a wireless mesh network in a manner that may not increase an amount of network traffic. When, however, network traffic dips below a threshold level, additional messages may be sent to certain mesh nodes that update rating information stored at those certain mesh nodes.

20 Claims, 8 Drawing Sheets

Related U.S. Application Data

(60) Provisional application No. 62/942,814, filed on Dec. 3, 2019.

(56) References Cited

U.S. PATENT DOCUMENTS

| | | | | |
|---|---|---|---|---|
| 8,745,733 | B2 * | 6/2014 | Niemela | H04L 63/1416 |
| | | | | 726/22 |
| 8,893,241 | B2 * | 11/2014 | Piliouras | G06Q 30/0269 |
| | | | | 713/176 |
| 9,384,334 | B2 * | 7/2016 | Burba | G06F 21/10 |
| 9,948,649 | B1 * | 4/2018 | Zhao | H04L 63/10 |
| 10,111,099 | B2 * | 10/2018 | Hunt | H04W 12/08 |
| 10,713,666 | B2 * | 7/2020 | Freishtat | H04L 67/22 |
| 10,802,760 | B2 * | 10/2020 | Zaretsky | G06F 3/0673 |
| 2013/0191904 | A1 ‡ | 7/2013 | Piliouras | G06F 21/6218 |
| | | | | 726/7 |
| 2014/0279623 | A1 * | 9/2014 | Mislove | G06Q 30/0282 |
| | | | | 705/319 |
| 2014/0280761 | A1 ‡ | 9/2014 | Rothschild | H04L 67/02 |
| | | | | 709/219 |
| 2015/0188964 | A1 * | 7/2015 | Sharma | H04N 21/6437 |
| | | | | 709/203 |
| 2015/0324555 | A1 ‡ | 11/2015 | Burba | H04W 4/08 |
| | | | | 726/27 |
| 2016/0028798 | A1 ‡ | 1/2016 | Agrawal | G06F 16/1834 |
| | | | | 707/751 |
| 2019/0082224 | A1 ‡ | 3/2019 | Bradley | G06Q 30/0282 |
| 2020/0097666 | A1 ‡ | 3/2020 | Weldemariam | G06N 3/08 |
| 2020/0344610 | A1 | 10/2020 | Duo | |
| 2020/0359349 | A1 * | 11/2020 | Duo | H04W 8/005 |
| 2021/0176639 | A1 | 6/2021 | Duo | |

OTHER PUBLICATIONS

U.S. Appl. No. 16/397,951 Office Action dated Apr. 29, 2021.

* cited by examiner
‡ imported from a related application

_US 11,438,963 B2_

METHOD FOR PROVIDING AN ELASTIC CONTENT FILTERING SECURITY SERVICE IN A MESH NETWORK

CROSS-REFERENCE TO RELATED APPLICATIONS

The present application is a continuation in part and claims priority benefit of U.S. patent application Ser. No. 16/397,951, filed Apr. 29, 2019, and claims priority benefit of U.S. provisional application No. 62/942,814, filed Dec. 3, 2019, the disclosures of which are incorporated herein by reference.

BACKGROUND OF THE INVENTION

Field of Invention

The present disclosure generally relates to increasing the efficiency of a wireless mesh network. More specifically, the present disclosure relates to distributing work amongst different mesh nodes in a wireless mesh network.

Description of the Related Art

Every day the use of wireless networks is expanding. Wireless mesh networks commonly use communications consistent with one of the 802.11 wireless communication standards that are commonly referred to as "Wi-Fi." Because of this, 802.11 communication channels are a preferred type of communication channel used in wireless mesh networks.

Wireless mesh networks typically include various mesh devices commonly characterized as access points or wireless nodes. In certain instances, devices known as wireless portals may implement the security filtering functionality of a firewall. In other instances, wireless portals may not be configured to perform a security filtering function at all. In either case, these portals also commonly communicate wirelessly with one or more wireless access points. Wireless access points may perform functions consistent with a portal (or wireless mesh portal) that receives 802.11 communications from a plurality of wireless mesh points. Wireless mesh portals also communicate with other devices over another type of communication network, where wireless mesh points typically only communicate with other devices using only one type of communication network. In such a network, wireless mesh points may communicate with other mesh points and with computers using only 802.11 communications. Both mesh points and mesh portals are both commonly referred to as "mesh devices" that include different functionality.

In a wireless mesh network, typically all wireless communication traffic is passed through a few (one or more) wireless mesh portals and many wireless mesh points. In certain instances, this can lead to an imbalance in a wireless network. For example, in instances where wireless mesh portals perform functions consistent with a firewall, more resources of the relatively few portal devices may be dedicated to security functions. This can cause the mesh portals to spend less than an optimal amount of resources performing their primary function of keeping communications flowing through the wireless network. This can occur when processors at these portals are not powerful enough to keep up with both communication traffic and security function processing. This imbalance can lead to wireless portals becoming a performance bottleneck that slows the flow of communication data through the network. What are needed are new forms of computer network security methods and apparatus that protect wireless networks in manageable ways that do not slow communications in the wireless network. Alternatively, when wireless mesh portals perform little or no wireless security functions, they may make a wireless mesh network vulnerable to hacking or they may cause the wireless portal to rely on a gateway or firewall to provide security filtering. In either instance, filtering functions consistent with preventing computing devices receiving information from accessing undesired content are not distributed throughout a conventional wireless mesh network.

Since current wireless mesh networks do not distribute content filtering functions to different devices in a wireless mesh network, a single mesh point or portal may receive and pass on redundant requests for prohibited content. This can lead reduced efficiency of a wireless mesh network because redundant requests to undesired content may be passed through different wireless mesh nodes in a manner that consumes precious bandwidth. As such, what are needed are methods that allow different mesh nodes to store information relating to a security function or a filtering function in a way that distributes security workloads through different devices that may include both mesh portals and mesh points in a wireless mesh network.

SUMMARY OF THE CLAIMED INVENTION

The presently claimed invention relates to a method, a non-transitory computer readable storage medium, and a system executing functions consistent with the present disclosure for allowing or blocking access to digital content based on an evaluation. A method consistent with the present disclosure may include receiving a query associated with accessing a website by a first wireless mesh node. This method may also send a message to a security computer that identifies the website to the security computer after which rating information may be received from the security computer and stored in a memory of the first wireless mesh node. That rating information may then be sent to a second wireless mesh node that stores the rating information in a memory of the second wireless mesh node.

When the method of the presently claimed invention is implemented as a non-transitory computer readable storage medium, a processor executing instructions out of a memory may implement a method consistent with the present disclosure. Here again this method may include receiving a query associated with accessing a website by a first wireless mesh node. This method may also send a message to a security computer that identifies the website to the security computer after which rating information may be received from the security computer and stored in a memory of the first wireless mesh node. That rating information may then be sent to a second wireless mesh node that stores the rating information at a memory of the second wireless mesh node.

A system consistent with the present disclosure may include a first wireless mesh node that receives a query associated with accessing a website. This system may also include a security computer that receives a message sent from the first wireless mesh node that identifies the website. This security computer may send rating information associated with the website to the first wireless mesh node that may store that rating information at a memory of the first wireless mesh node. After the first wireless mesh node receives the rating information, it may send that rating information to a second wireless mesh node of the system that also stores the rating information in a memory local to the second wireless mesh node.

DETAILED DESCRIPTION

Figure 1:
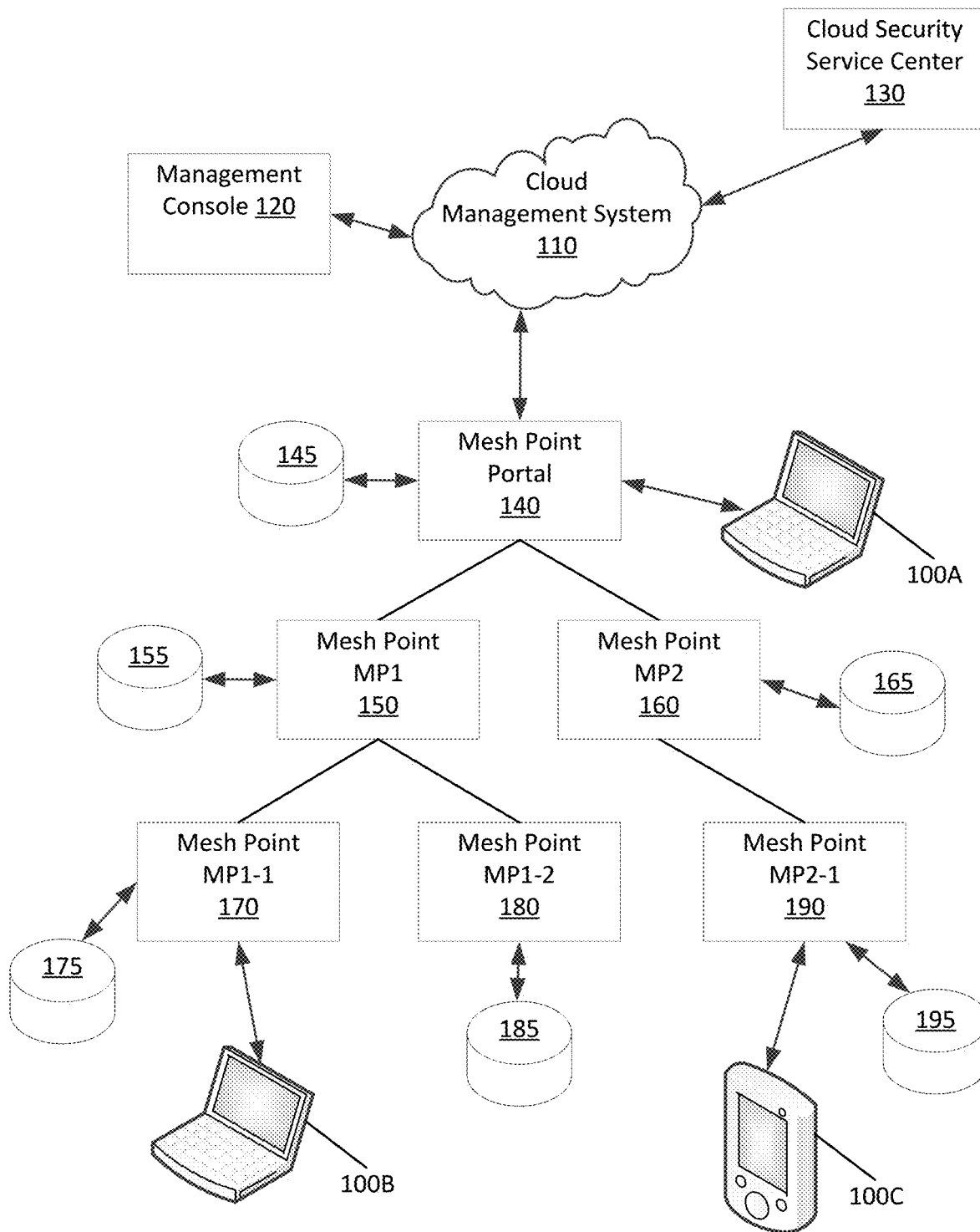
FIG. 1 illustrates elements of a wireless mesh network that communicates with a cloud management system.

The present disclosure distributes processing capabilities throughout different nodes in a wireless network. Methods and apparatus consistent with the present disclosure increase the efficiency of communications in a wireless network because they help minimize the need to forward communications to other nodes in the wireless network. Apparatus and methods consistent with the present disclosure perform a function of elastic content filtering because rating information may be stored in different memories of different mesh nodes according to rules or profiles associated with a wireless mesh network as responses to requests are sent back along a route in the wireless mesh network in a manner that may not increase an amount of network traffic. When, however, network traffic dips below a threshold level, additional messages may be sent to certain mesh nodes that update rating information stored at those certain mesh nodes. Apparatus and methods consistent with the present disclosure distribute content ratings to different nodes in a wireless network such that different wireless nodes may block redundant requests to undesired content without increasing messaging traffic.

Methods consistent with the present disclosure may identify a rating associated with digital data that was requested from a computer. For example, a computer may send a request when a user of that computer wishes to view a website. That request may be passed through one or more mesh nodes and methods consistent with the present disclosure may identify that the requested website is associated with either a good or a bad content rating. After the content rating has been identified, a response message may be sent back to the requesting computer via the one or more mesh nodes that originally passed the website access request. As these response messages are passed back to the requesting computer, each of the respective mesh nodes that pass the response message may store the rating of the website in a respective cache memory. The data stored in the caches of each of these mesh nodes may include information that cross-reference data identifiers with content ratings. These data identifiers may identify a data source using a universal record locator (URL), a domain name, a file name, or other information that identifies a data set or computer associated with a request. Each of the mesh nodes that receive the response message associated with the website request can identify the rating of that website without increasing network traffic. In an instance where a subsequent request is received from the requesting computer or another requesting computer to access that same website, a mesh node that received that subsequent request may identify the rating of the website by accessing its own local cache memory. This process allows each mesh node of a plurality of mesh nodes to block subsequent access requests to websites that are assigned a bad reputation.

The terms "access point" or "wireless access point" in the present disclosure refer to a device that may be wirelessly communicatively coupled to a computer directly. As such, the terms "access point" or "wireless access point" may refer to either a mesh portal or mesh point, the terms mesh portal relates to a wireless device that performs functions that a mesh point need not perform. Both mesh portals and mesh points may perform functions consistent with a wireless access point because both mesh portals and mesh points may act as a wireless access point that directly wirelessly communicates with a computer in just a single hop, without wireless communications passing through another wireless device. The terms mesh node in the present disclosure may be used to refer to either a mesh portal or a mesh point that uses wireless communications to transmit and receive wireless computer network messages and data.

Typically the terms "firewall" or "gateway" in the present disclosure refer to computing devices that communicate over wired network connections. In certain instances, however, a mesh node may include functionality consistent with a firewall or gateway. Functions conventionally associated with a firewall or gateway may be performed by a mesh portal or by a mesh point. In these instances, a mesh portal or a mesh point may perform functions consistent with evaluating content ratings, deep packet inspection, or may include anti-virus program code.

In certain instances mesh portals consistent with the present disclosure may wirelessly communicate with a plurality of wireless mesh points and may communicate over a wired network. As such, a mesh portal may be act as a gateway between wireless mesh points and a wired local area network, for example. In such instances, a mesh portal may broadcast transmissions that include a mesh identifier (MSSID) and a cluster name that advertise the wireless network to mesh points that are configured to operate as members of a particular wireless mesh network. In other instances, a mesh point may include a cellular (e.g. 3G, 4G, LTE, or 5G) link or more than one mesh node in a mesh network may be configured to operate as a redundant mesh point that uses a wired or a wireless network connection.

FIG. 1 illustrates elements of a wireless mesh network that communicates with a cloud management system. FIG. 1 includes cloud management system 110, management console 120, cloud security center 130, mesh portal 140, mesh points (150, 160, 170, 180, & 190), mesh caches (145, 155, 165, 175, 185, & 190), and various computing devices (100A, 100B, & 100C). Communications between computing devices wireless devices 100A-100C may be configured to be transmitted wirelessly with any of the mesh points (150, 160, 170, 180, or 190) or with mesh portal 140 of FIG. 1. Mesh portal 140 may store data in mesh cache 145, mesh point 150 may store data in mesh cash 155, mesh point 160 may store data in mesh cash 165, mesh point 170 may store data in mesh cash 175, mesh point 180 may store data in mesh cash 185, and mesh point 190 may store data in mesh cash 195. Management console 120 may be a computing device or a user interface that allows administrators to set configurations or requirements of mesh networks.

Note that mesh points 150 and 160 are also referred to respectively as MP1 and MP2 this notation including a single number following a mesh point designator of "MP" indicates that mesh nodes 150 and 160 are located one wireless hop from mesh point portal 140. Note also that Mesh points 170, 180, and 190 are each located two hops from mesh point portal 140. These mesh points are also referred to respectively as MP1-1, MP1-2, and MP2-1. Here the two numbers following the "MP" designator indicate that that mesh points must pass through two hops. The MP1-1 designation in FIG. 1 indicates that mesh point 170 is a first mesh point that is two hops from mesh point portal 140, where one of those hops includes mesh point MP1 150. The MP1-2 designation indicates that mesh point 180 is a second mesh point that is two hops from mesh portal 140, where one of those hops includes mesh point MP1 150. The MP2-1 designation in FIG. 1 indicates that mesh point 190 is a first mesh point that is two hops from mesh point portal 140, where one of those hops includes mesh point MP2 160.

FIG. 1 illustrates computing device 100A communicating with mesh point portal 140, computing device 100B communicating with mesh point 170, and computing device communicating with mesh point 190. Note that communications from computing device 100A are passed directly to mesh point portal without having to pass through another wireless mesh device. Communications from computing device 100B and 100C each have to pass through two mesh points before reaching mesh point portal 140 (a total of 3 hops that include device to a first mesh point—first mesh point to a second mesh point—and second mesh point to a mesh portal).

Whenever a particular mesh point receives a request to access a website or data stored at the internet, that request may be passed through other mesh points, and through a mesh portal, such as mesh portal 140 of FIG. 1. Mesh portal 140 may then pass the request via cloud management system 110 to cloud security service 130 that may perform an analysis related to the requested website or internet data. Cloud security service 130 may perform any number of security checks on the website or received data. For example, cloud security service 130 may look up a reputation of a website to see if that website has been assigned a bad reputation. Alternatively or additionally, cloud security service 130 may perform other tests, such as a deep packet inspection (DPI) scan that looks for virus/malware patterns or run time code analysis that checks to see if requested data performs a nefarious act.

After a result is received from the cloud security service center 130, the result may be passed through each respective mesh node (mesh point portal or mesh point) until that result is passed back to the computing device that requested access to the website or internet data. As the result is passed through each respective mesh node, the result may be stored in a cache associated with each individual mesh node that the result message passed through. For example, mesh point portal 140 may store a received result in cache 145, mesh point 150 may store the result in cache 155, and mesh point 170 may store the result in cache 175 without increasing an amount of network traffic.

The information stored in the caches of FIG. 1 may be associated with a time-to-live time that may be set based on one or more rules received via management console 120 and may include a hash of access information (e.g. a universal record locator—URL) and a test result or verdict. This hash of information or other information associated with the results stored in a cache may then be deleted after the time-to-live time for that data has transpired. Time-to-live times may be set according to one or more conventions that may be related to how far particular mesh points are from a mesh portal. As such, a time-to-live for data stored in cache memories closer to a mesh portal may be different from time-to-live data stored in cache memories that are farther the mesh portal. Distances to a wireless mesh portal may be identified by a number of hops, where a fewer than a threshold number of hops to a mesh portal may be considered "close" to the mesh portal. A number of hops that correspond to or that are greater than a threshold number of hops may be considered "far" from the mesh portal. Because of this, time-to-live times for storing reputation information may be associated with a relative proximity or distance to the mesh portal.

In certain instances, a greater number of hops may be associated with a lower time-to-live time value at each respective mesh point. As such, a mesh portal may be assigned a greatest time-to-live time and a mesh point located a maximum number of hops away from the portal may have a lowest value of a time-to-live time for particular cache entries. In an instance when a redundant request is sent to a mesh point that recently purged entries in their cache, that mesh point may pass a query to another mesh node that still maintains information identifying a data source that is has been assigned a bad reputation. This could result in the mesh portal blocking the request and sending a message to the mesh point. Both the mesh portal and the mesh node may then update information stored at their respective cache memories that cross-references updated time-to-live indicators and bad reputation information. By having longer time-to-live time settings for nodes closest to a portal, the mesh portal will be less likely to send access requests to the security computer, while mesh nodes farther from the portal may be able to free cache memory to store other data. Administrators may also configure time-to-live times that cause certain parts of a network to retain cache entries longer than other parts of a network. As such, time-to-live times may be set according to various different conventions or according to various different settings.

A particular time-to-live time may be stored in the cache memory used to cross-reference a request identifier and with a reputation. In certain instances, digital content that is considered undesirable may be assigned shorter time-to-live times than digital content that is associated with a threat. As such, time-to-live times may be set based on a convention that assigns time settings based a level of undesirability where certain types of content (e.g. malware) may be associated with a greater undesirability level than other types of content (e.g. offensive content or content that is prohibited by a corporate policy). This may help limit an amount of work that is performed by a security computer. For example, the security computer may have to spend more time to identify that a particular set of requested data includes a virus than amount of time required to identify that a particular website is associated with undesired content. In this example, the security computer may have to test the requested data using a compute intensive sandboxing technique, where the identification that the particular website stores undesired data may be identified using a less compute intensive operation of parsing a list of URLs and ratings. As such, administrators may adjust time-to-live times for data stored in particular cache memories of mesh nodes according to a strategy that best fits their circumstances or preferences.

A mesh node may also store a start time associated with a particular time-to-live time such that the mesh node could more easily monitor when to delete particular entries from the cache memory. To identify when a particular entry should be deleted, all that need be done is to identify an amount of time that has transpired since an entry was stored in the cache and to see if that amount of time meets or exceeds the time-to-live time associated with that particular entry. Once the time-to-live for a particular entry has passed, that entry may be deleted from the cache.

The path or route along which wireless communications will pass in a wireless mesh network consistent with the present disclosure may be identified according to one or more conventions or rules associated with managing the wireless mesh network. Mesh portals may be initially configured as being a portal according to settings that may be received via management console 120 of FIG. 1. Some mesh points in a mesh network may also be capable of being promoted to assuming the responsibilities of a wireless mesh portal. Alternatively or additionally, designated mesh portals or promotable mesh points may each have the capability of communicating with other computing devices via at least two different types of wireless communication channels. For example, one communication channel may use 802.11 communications and a second channel may use a second type of wireless communication channel (e.g. a wireless cellular communication channel).

Rules associated with discovering an optimal path or route to send wireless data communications may cause wireless nodes to connect with other nodes based on signal strength measurements, error rate measurements, or signal to noise measurements. Alternatively these rules may be associated with initial administrator settings or a maximum number of hops to a mesh portal. Furthermore, the route that communications travel may be modified as network conditions change. For example, as relative signal strengths change, as transmission error rates change, or as signal to noise ratios change. Alternatively communication routes may be changed when devices fail or when certain nodes in the wireless network become congested. Congestion in a wireless network may be identified based on a number of user devices communicating with particular nodes increasing to or above a threshold amount number of user devices. Congestion may also be identified based on a total number of communications passed through a mesh node at particular points in time.

Methods consistent with the present disclosure may identify optimal routes from each mesh point to a mesh point portal in a wireless mesh network. As such the route connects mesh point MP1-1 170 with mesh portal 140 that includes mesh point MP1 150 may be considered optimal. Similarly, a route that traverses mesh points MP2-1 190 and MP2 160 mesh portal 140 may be considered optimal.

Figure 2:
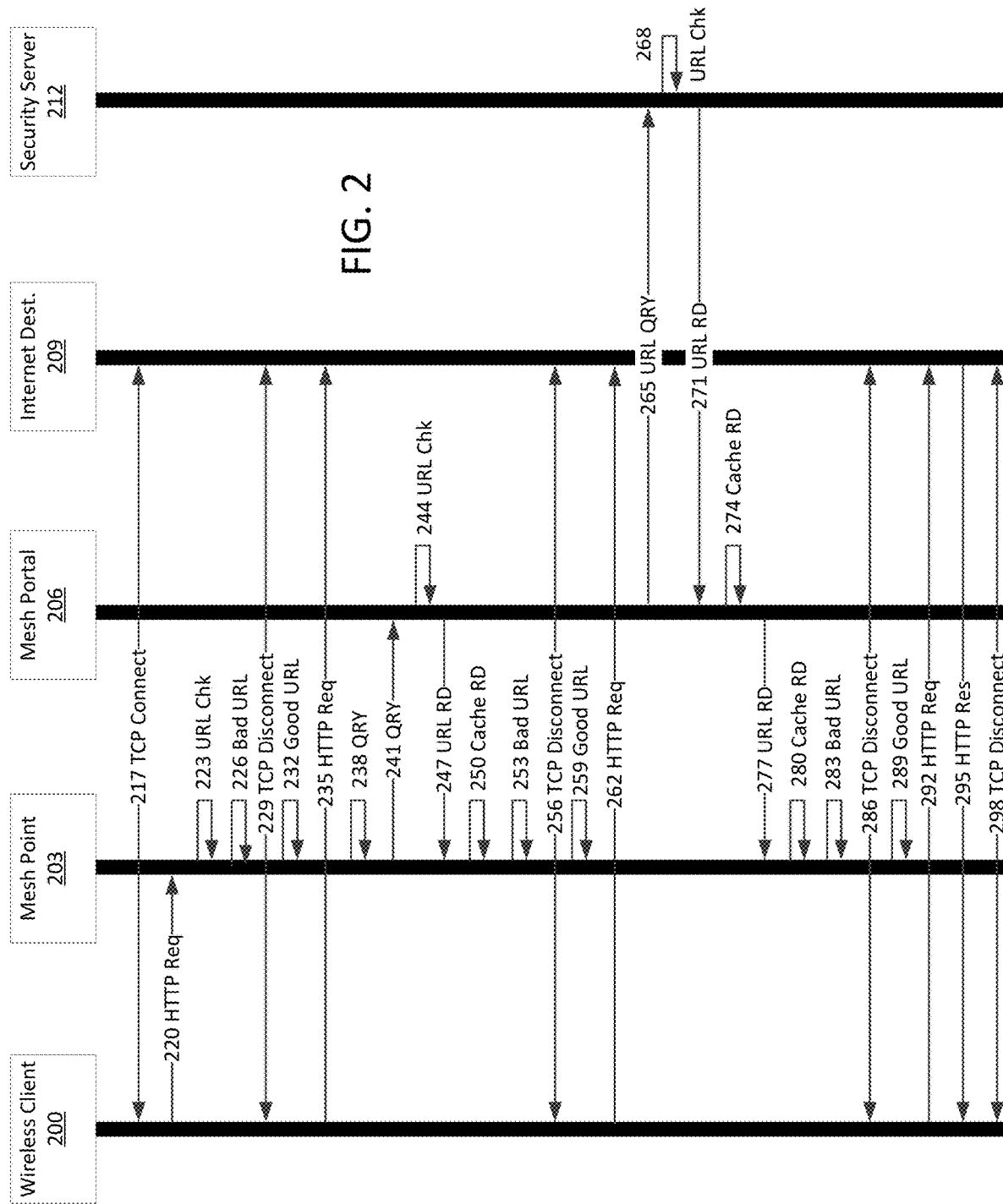
FIG. 2 illustrates communications that pass through different mesh devices and illustrates that each respective mesh device may store information in a cache memory regarding those communications.

FIG. 2 illustrates a series of steps that may be performed when filtering websites that should not be accessed from websites that can be accessed. FIG. 2 includes wireless client 200, mesh point 203, mesh portal 206, Internet destination 209, and security sever 212. Wireless clients consistent with the present disclosure may include any type of computing device that can communicate wirelessly with a wireless access point device. As mentioned above, access points in a wireless mesh network may be configured to operate as a mesh point or a mesh portal, where mesh points communicate with other devices using only wireless communications, and mesh portals communicate with some devices wirelessly over a first type of communication interface and communicate with other devices over a second type of communication interface (wired or wireless). FIG. 2 begins with a first step where wireless client 200 connects to a computer via the Internet (e.g. Internet destination 209) using communications 217 that form a communication connection according to the transfer control protocol (a TCP connection). Wireless client 200 may send a request 220 using the hypertext transfer protocol (HTTP) that is received by mesh point 203. A processor at mesh point 203 may then check in step 223 to see if a local cache memory at mesh point 203 stores rating information that identifies whether a universal resource locator (URL) included in HTTP request 220 is associated with a good or a bad reputation. When mesh point 203 identifies that the URL is associated with a bad reputation as illustrated in step 226 of FIG. 2, the TCP connection formed in step 217 of FIG. 2 may be terminated (a TCP disconnect) in step 229. Alternatively, mesh point 203 may identify that the requested URL is associated with a good reputation in step 232 and mesh point 203 may allow the HTTP request to be sent to internet destination 209 based on this good reputation. HTTP request 235 may pass through mesh point 203 and mesh portal 209 on its way to a computer associated with the requested URL at internet destination 209.

In certain instances a query may be generated in step 238 that is sent to mesh portal 206 in step 244 of FIG. 2. The generated query may include information that identifies content that has been requested by wireless client 200. This query may include a URL that identifies a website that wireless client 200 is attempting to access. The query may have been sent to mesh portal 206 in step 241 after mesh point 203 has identified that a cache memory at mesh point 203 does not store reputation data related to the URL. The URL check 244 may be performed by a processor executing instructions out of a memory at mesh portal 206. The URL check 244 may identify whether a cache memory at mesh portal 206 stores reputation information of the data identified in query 241. When mesh portal 206 does store rating information relating to data identified in query 241, mesh portal 206 may send a rating associated with that requested data back to mesh point 203 in step 247 of FIG. 2. Mesh portal may then store that rating in the cache memory at mesh point 203 in step 250 of FIG. 2. This may allow mesh point 203 to identify that requests for particular data are associated with a bad reputation 253 or a good reputation 259. Here again requested data may be associated with a reputation associated with a particular URL. As such, reputation data stored in a cache at mesh portal 206 may be may be sent to mesh point 203 such that future requests for the particular URL may be identified as bad requests by mesh portal 203. Here again requests to bad URLs may result in a TCP connection being disconnected in the TCP disconnect step 256 of FIG. 2.

In other instances, a particular HTTP request 262 may be passed through mesh point 203 and mesh portal 206 that requests data from Internet destination 209. This request may cause mesh portal 206 to send a query 265 to security server 212. Security server 212 may then check to see if a URL associated with HTTP request 262 is associated with either a good or a bad reputation in step 268 of FIG. 2.

Security server 212 may then pass URL rating data back to mesh portal 206 in step 271 and mesh portal 206 may store that rating data in its local cache memory in step 274. Next mesh portal 206 may pass the rating data received in step 271 to mesh point 203 in step 277 of FIG. 2 and mesh point 203 may then store the rating data in the cache memory at mesh portal 203 in step 280 of FIG. 2. Here again this rating may be bad or good and mesh point 203 may identify that a URL is associated with a bad reputation in step 283 or with a good reputation in step 289. When the URL is associated with a bad reputation a TCP connection may be disconnected in step 286 of FIG. 2. In certain instances the queries, like queries 241 or 265 may include information that identifies a source of data on the Internet without a TCP connection being formed with the website before identifying whether a URL of that website has been assigned with either a good or a bad reputation.

When a URL is associated with a good reputation HTTP request 292 may be sent to internet destination 209 that may respond with HTTP request response 295 that may include data associated with HTTP request 292. After wireless client 200 completes a communication session with a destination associated with a good URL, a TCP connection may be disconnected in step 298 of FIG. 2. For example, when a user of wireless client 200 closes a web browser window displaying content received from a computer with a good URL, a TCP connection between wireless client 200 and the computer with the good URL may be disconnected.

Figure 3:
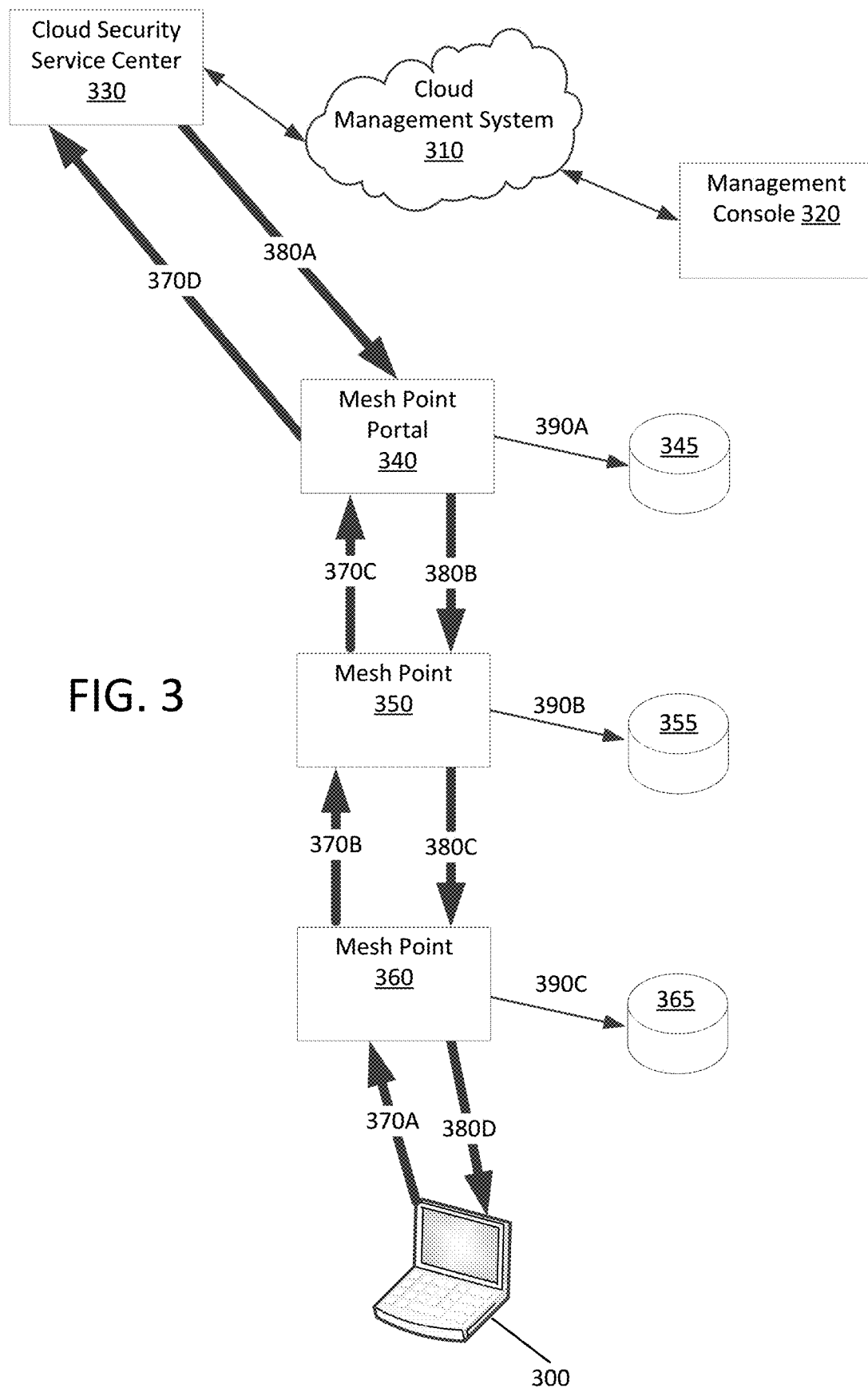
FIG. 3 illustrates a flow chart of steps that allow different mesh nodes to each store security related information such that any one of those different mesh nodes can perform a security function.

FIG. 3 illustrates communications that pass through different mesh devices and illustrates that each respective mesh device may store information in a cache memory regarding those communications. FIG. 3 includes cloud management system 310, management console 320, cloud security service center 330, mesh point portal 340 that includes cache 345, mesh point 350 that includes cache 355, mesh point 360 that includes cache 365, and computing device 300. Requests such as request 370A may be sent to access a website from computer 300. Note that request 370A is passed through different mesh points (360 & 350) and through mesh portal 340. Note also that mesh point 360 passes the request to mesh point 350 via communication 370B, mesh point 350 passes the request to mesh portal 340 via communication 370C, and that mesh point portal 340 passes the request to cloud security service center 330 via communication 370D. As mentioned in respect to FIG. 1, cloud security service center 330 may perform a series of checks or tests when a computing device attempts to access a website or attempts to access data via the Internet. After cloud security service center 330 performs checks or tests, a result may be received at mesh portal 340, then at mesh portal 350, then at mesh portal 360 as that response travels to computing device 300.

Here a set of communications 380A, 380B, 380C, and 380D relate to a response message originating from cloud security service center 330. Communications 380A, 380B, 380C, and 380D are passed through each respective mesh node (340, 350, & 360). As each respective mesh node receives the response message, each of those mesh devices may store result information in a respective cache. As such, mesh point portal 340 may store the result in cache 345 via cache access 390A, mesh point 350 may store the result in cache 355 via cache access 390B, and mesh point 360 may store the result in cache 365 via cache access 390C. After this result information has been stored in these different caches, any of the mesh devices (340, 350, or 360) that receives a subsequent request to access the previously requested content may identify whether the subsequent access request should be allowed or blocked based on the result stored in the respective caches. This means that subsequent requests for prohibited content would not have to be passed through another mesh device or to the cloud security service center 330. Instead, prohibited content could be blocked immediately. Alternatively, content identified as being allowed could be accessed without sending subsequent requests for the same content to cloud security service center 330. In certain instances, computer 300 may also store a list of websites or web data that should be blocked and an application program operational at computer 300 may prevent other processes executing at computer 300 from sending requests for prohibited content based on the list of websites or web data that should be blocked.

The path or route traversed by communications 370A-370C and 380B-380D traverses mesh point 360, mesh point 350, and mesh portal 340. Here again this route may have been identified as an optimal route in a wireless mesh network and a wireless mesh network may include many different optimal routes that link different mesh points to a mesh portal. In certain instances an optimal route may have been identified by a process according to rules as discussed in respect to FIG. 1. In such instances, each mesh point and a mesh portal may store information in a routing table that identifies each node in an optimal route. Each mesh portal may then store this routing information in a memory such as cache memory 345, 355, and 365. In such instances, mesh point portal 340 may store multiple different optimal routes in a memory, such as cache 345. Because of this, mesh point portal 340 may store more information than any individual mesh point. For example, computing device 100B of FIG. 1 may have attempted to access a first website and 100C may have attempted to access a second website. As such, the cache 145 of mesh portal 140 would store reputation information regarding both the first and the second website, yet cache memories of mesh points 150 and 170 would not store reputation information associated with the second website and cache memories of mesh points 160 and 190 would not store reputation information associated with the first website. In such an instance, if computing device 100C were to attempt to access the first website, the request would pass to mesh point 190, then to mesh point 160, and then the mesh portal 140, where mesh portal 140 could identify whether the first website was associated with a good or bad reputation by cross-referencing information stored in cache 145. Data in communications passed back from mesh portal 140 through mesh point 160 and 190 could then be used to update reputation information stored in respective cache memories 165 and 195. Furthermore, application program code executing on computing device 100C may also store this reputation information after receiving a response to access the first website.

An advantage of methods consistent with the present disclosure is to distribute reputation information to caches at different mesh nodes in a route without increasing an amount of network traffic. Such methods help optimize an amount of bandwidth available to computing devices accessing a wireless mesh network because these methods prevent bad content requests from being passed through nodes in a wireless mesh network redundantly. Since wireless mesh networks will typically have less total overall bandwidth that a comparative wired network, eliminating unnecessary communications in a wireless mesh network can cause the wireless network to function with a greater level of efficiency. In instances where wireless network communication traffic dips below a threshold level, there may be enough wireless network bandwidth available for a mesh portal to push reputation data to mesh points that have not requested access to resources that were requested by computing devices via a different route. As such, when an mesh portal, such as mesh portal 140 of FIG. 1 or mesh portal 340 of FIG. 3 identifies that a number of wireless communications per unit time have dipped below a threshold level, that mesh portal may identify mesh points along routes in a mesh network that are not storing reputation information associated with access requests made via a different route. Because of this, a mesh portal, such as mesh portal 140 of FIG. 1 after identifying that wireless traffic has dipped below a threshold level may send messages to mesh portals that identify reputations associated with access requests made by computing devices via a different route. Part of the elasticity of the methods of the present disclosure may include temporarily increasing an amount of wireless communication traffic such that cache memories of different mesh points can be updated with information stored at a mesh portal when wireless communications dip below a threshold level.

TABLE 1

Data Identifier - Content Rating Cross-Reference

| Data Type | Data Identifier | Content Rating | Time-to-Live |
|---|---|---|---|
| URL | www.creapy.com | Bad 2 | Not Applicable |
| URL | www.Xrated.com | Bad 5 | 10 |
| URL | HTTP://ourcompany-INT/Salary_List | Bad 3 | 5 |
| URL | HTTP://.ourcompany-INT/Personal_DATA | Bad 3 | 5 |
| URL | www.undesired1.com | Bad-V1 | Increase Each Hop 2-5 |
| URL | www.undesired2.com | Bad-V2 | Decrease Each Hop 5-3 |
| URL | www.threat.com | Bad 5 | 10 |
| Domain Name | BadDomain | Bad 5 | 10 |
| Video | Only Explicitly Approved Video Files | Bad 1 | 2 |
| Video | Training Video ABC | Good | 2 |
| URL | HTTP://ourcompany-INT | Good | Priority |
| File Name | HR_Resource_Manual.doc | Good | Priority |

Table 1 illustrates a table of information that may be used to cross-reference data identifiers to content ratings and time to live metrics. Note that each of the data identifiers in Table 1 may be associated with a data type. While data type included in Table 1 are URL, domain name, a type of video data, and a file name, methods consistent with the present disclosure may associate any type of data with a data identifier, a content rating, and a time-to-live metric. Note that data identifiers included in table 1 include various different specific URLs, specific domain names (e.g. BadDomain), Only Explicitly Approved Video Files, Training Video ABC, and HR_Resource_Manual.doc. Content ratings included in table 1 include Bad 1, Bad 2, Bad 3, Bad 5, Bad-V1, Bad-V2, and Good. The content rating of Bad 5 may identify content that is has a greater level of undesirability that a level of undesirability associated with either the Bad 1 or Bad 2 content ratings. Note that time-to-live metrics included in table 1 are: Not Applicable, 2, 5, 10, Increase Each Hop 2-5, Decrease Each Hop 5-2, and Priority. These time-to-live metrics may be used to set time-to-live times at one or more mesh nodes according to conventions discussed below.

Table 1 illustrates that methods consistent with the present disclosure may be used to allow or block access to data at particular websites or may be used to allow or block access to certain type of data that may reside inside or outside a corporate network. In a first example, URL HTTP://ourcompany-INT is associated with a good rating while HTTP://ourcompany-INT/Salary_List and HTTP://ourcompany-INT/Personal_DATA are associated with a bad rating. In such an instance, users of devices that wirelessly connect to the network may be allowed to access certain parts of a corporate Intranet, yet not others. This may help prevent access to protected data stored in a corporate Intranet that may include a salary list or that may include employee personal data. Similarly, access to file data stored in a database of a corporate network may be allowed or denied. Note that access to the document HR_Resource_Manual.doc and Training Video ABC are allowed based on a good content rating. Note that data identifiers may also identify classes of content that may not be accessed unless explicitly allowed, for example, one of the data identifiers indicates that Only Explicitly Approved Video Files can be accessed via the corporate wireless mesh network. This may prevent employees from watching a video provided by a video streaming service via the corporate wireless network, yet allow access to video data associated with a function of the company, such as training.

Note that bad content ratings in table 1 vary from 1 to 5, a bad rating of 1 may identify content that is undesired, where a content rating of 5 may correspond to highly sensitive or destructive data. As such, content that includes explicit (X-Rated) materials, threats (e.g. malware or viruses), or known bad domains may be given a bad rating of 5, while data that may be unpleasant in nature (e.g. data associated with www.creapy.com) may be given a bad rating of 2. In certain instances, content ratings may be variable as indicated by content ratings Bad-V1 and Bad-V2 of table 1. Such variable content ratings may be used to adjust a time that particular mesh nodes retain an entry in for data included in table 1, where a time-to-live for particular table entries at different mesh nodes change each hop from a mesh portal. For example, a time-to-live metric for each mesh node may increase from a time-to-live metric of 2 to a time-to-live metric of 5 incrementally with a number of hops as indicated by the Increase Each Hop 2-5 entry in table 1. Alternatively a time-to-live metric may decrease after each hop.

An increasing or decreasing time-to-live may be set according to a convention that associates an increase or decrease with one or more parameters. For example, program code receiving an indication that a time-to-live metric should be decreased for each hop could be specified by a decrease each hop indicator and a range of 5-3. In such an instance a mesh portal may be associated with a time-to-live metric for content from www.undesired2.com of 5, a mesh point one hop from the mesh portal may store a time-to-live metric of 4 in its cache and a mesh point two or more hops from the mesh portal may be assigned a time-to-live metric for the same content. Note that other time-to-live metrics included in table 1 are Not Applicable, Priority, 2, 5, and 10. Each numeric time-to-live metric may be associated with a specific amount of time (e.g. minutes or hours) or may be associated with a mathematical progression where each higher number corresponds to a time associated with a formula for calculating a time-to-live time. An indication of Not Applicable may be used to identify that a particular entry is not associated with a specific time-to-live. A Priority time-to-live may identify that entries with this rating should be deleted when the cache memory of a mesh point is full. As such, a Priority time-to-live may indicate entries that should be deleted first.

In certain instances, a time-to-live may increase as a number of requests for the same content increases over a period of time. In other instances, a time-to-live may not be used at all. In yet other instances, entries in a cache may be deleted on a first in first out basis when the cache fills up. As such, cache memories consistent with the present disclosure may be managed in various different ways.

Figure 4:
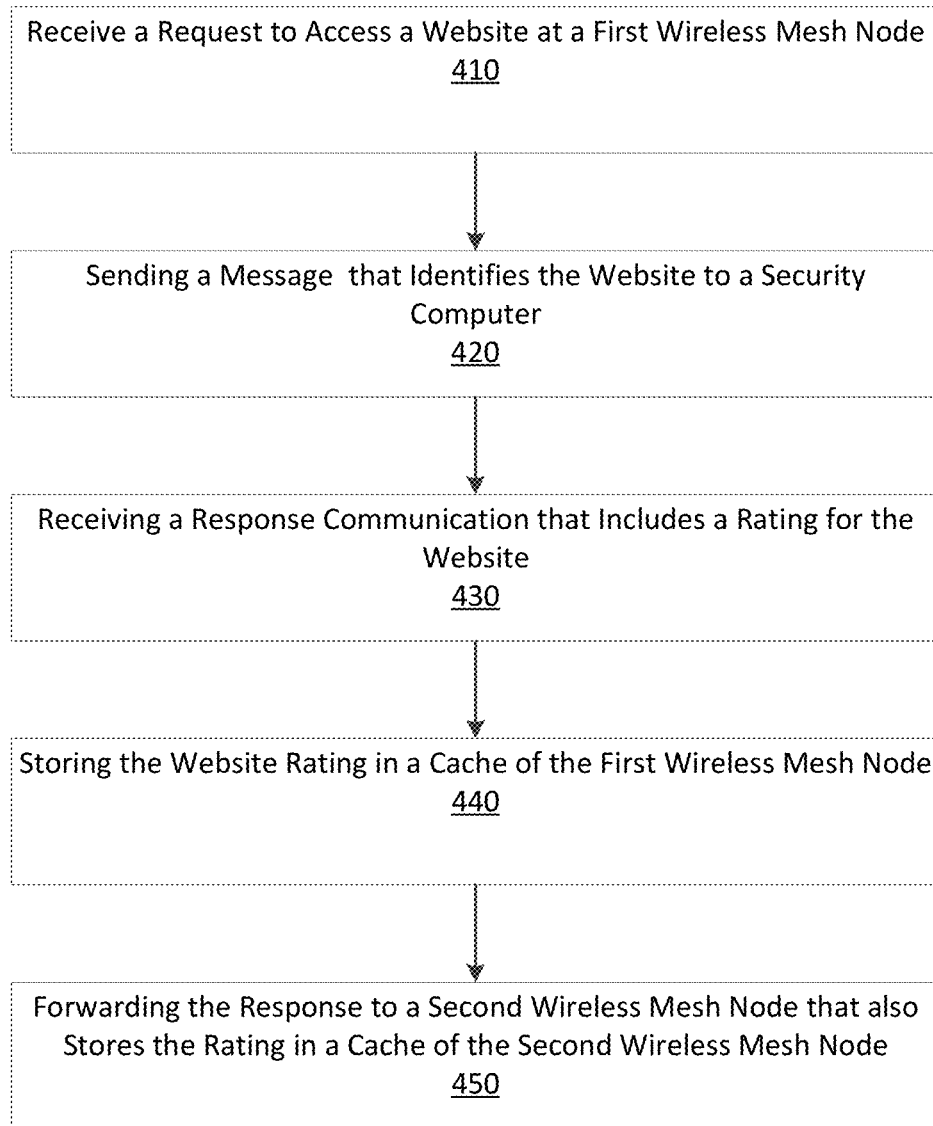
FIG. 4 illustrates a flow chart of steps that allow different mesh nodes to each store security related information such that any one of those different mesh nodes can perform a security function.

FIG. 4 illustrates a flow chart of steps that allow different mesh nodes to each store security related information such that any one of those different mesh nodes can perform a security function. FIG. 4 begins with step 410 where a first wireless mesh node receives a request to access a website or data that is stored at a computing device. The request received in step 410 of FIG. 4 may include a universal resource locator (URL) that identifies a website. Alternatively or additionally, this request may include a link, pointer, or instructions that cause a computer to send data to a requesting computer. After step 410, the first mesh node may send a message to a security computer that identifies the website or data stored at the computer in step 420 of FIG. 4. Next, in step 430 a response may be received at the first wireless mesh node that identifies a security rating associated with the website, with the requested data, with a domain, or with the computer that stores requested data.

While not illustrated in FIG. 4, the security computer after receiving the access request may access a database to look up the rating associated with the website with the requested data or with the computer that stores requested data. In an instance where no rating relating to the request is stored in the database, the security computer may access other databases that store rating information. Alternatively or additionally, the security computer could perform a series of tests on data retrieved from the website or computer. These tests could include, for example, deep packet inspection or antivirus scans. In certain instances, a test performed at a security computer may include interpreting or manipulating the received data as the security computer looks for suspicious or malicious activity performed by data received from the website or computer associated with the request. As such, the security computer may perform functions of checking to see whether requests are associated with computers that already are associated with a bad reputation or the security computer may perform more advanced analysis that could be performed by a firewall or a computer that evaluates computer data in a secure environment that is commonly referred to as a "sandbox." "Sandboxes" are computers that have the capability to access data, open files, or execute program code before that data, files, or program code can be accessed by a requesting computer. In the event that data, files, or program code received by the sandbox computer performs a suspicious or malicious act, the sandbox computer can be used to identify that the data, files, or program code should be assigned a bad rating before a requesting computer can be exploited or damaged by the suspicious or malicious act. As such, the security computer may be used to identify a reputation associated with an access request by various means. In certain instances, various actions such as reputation look up, deep packet inspection, or sandboxing tests may be performed at one or more computing devices optimized to perform one or more particular security functions.

After step 430 of FIG. 4, a processor at the first wireless mesh node may store information in a cache memory that includes the rating associated with the website, the requested data, or the computer that stores the requested data. The rating may be stored in a manner that cross-references the rating with a URL or other information that identifies requested data, a requested file, a domain, or information that identifies a computer associated with a particular request. The first wireless mesh node may then send (forward) the response with the rating to a second wireless mesh node in step 450 of FIG. 4. This second wireless mesh node may also store the rating in its own cache.

The rating may be stored in each respective cache of each respective mesh node that passes information relating to the request back to the computer that originally made the request. This method improves the efficiency of a wireless network because no additional message traffic may be required to share cache information between different mesh nodes along a path that traverses multiple mesh nodes.

Figure 5:
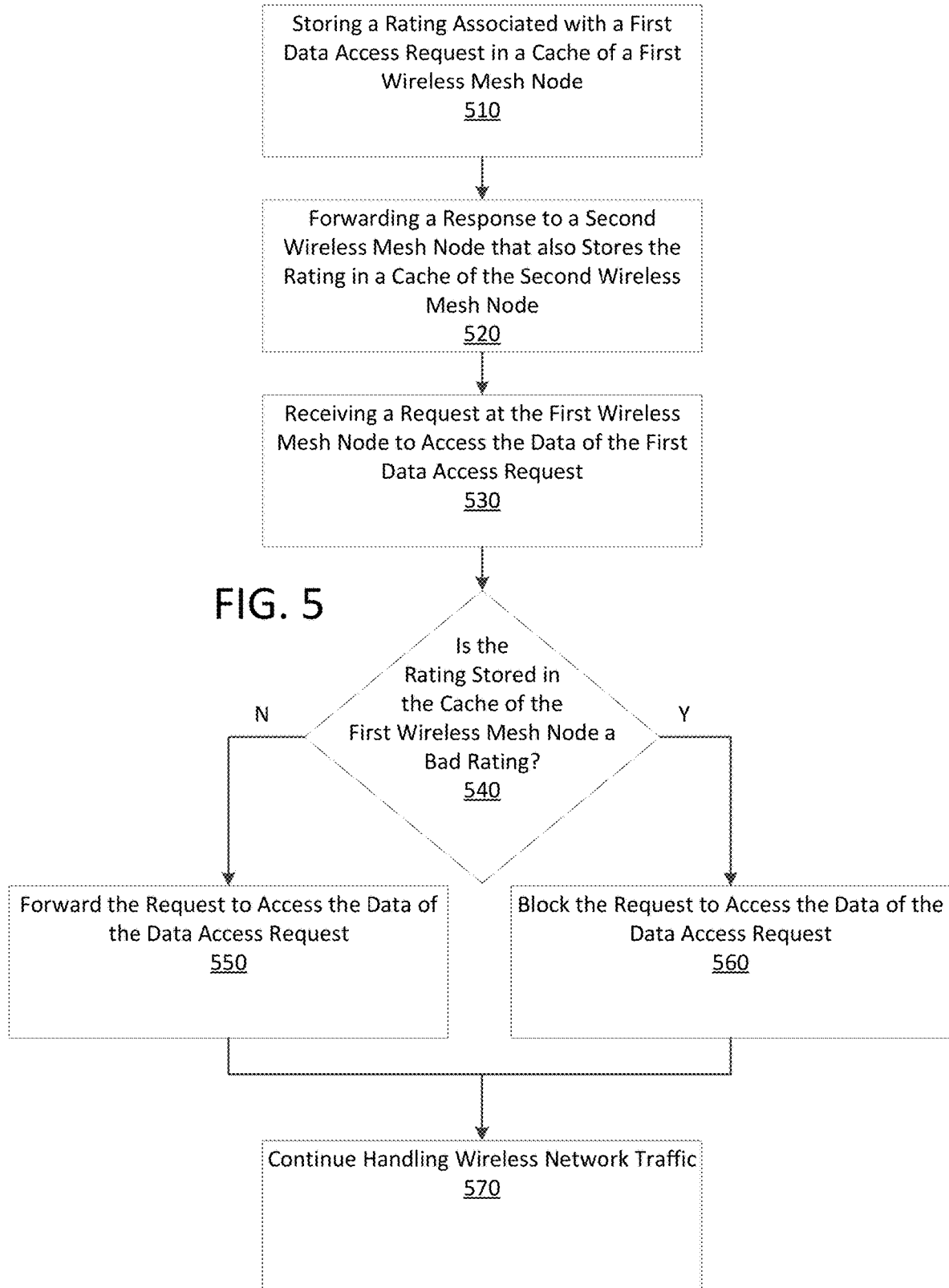
FIG. 5 illustrates a series of steps where any mesh node in a set of mesh nodes share the work of identifying whether a request for computer data is associated with a known rating or reputation.

FIG. 5 illustrates a series of steps where any mesh node in a set of mesh nodes share the work of identifying whether a request for computer data is associated with a known rating or reputation. FIG. 5 begins with step 510 where a rating associated with a first data access request is stored in a cache of a first wireless mesh node. The rating stored in step 510 may have been included in a response message associated with the first data access request. Note that the response message may traverse the same set of mesh nodes that the first data access request traversed. As such, a first computing device may have sent the first request to the second wireless access node, the second wireless access node may have forwarded that request to the first wireless access node, the first wireless access node may have forwarded that request to a security computer, and the security computer may have sent the response to the first wireless access node.

Next in step 520, the first wireless mesh node may forward the response to the second wireless mesh node that may also store the rating in a cache memory local to the second wireless mesh node. Next, the first wireless mesh node may receive a second request in step 530 of FIG. 5. Note that this second request may have been received directly from a requesting device without that request being passed through another mesh node. Determination step 540 may be performed by a processor at the first wireless mesh node that checks to see whether the requested data is associated with a bad rating stored in the cache of the first wireless mesh node. In the instance when the request is found to be associated with a bad rating or reputation, the processor at the first wireless mesh node may then prevent (block) the second request from being sent to another computing device in step 560 of FIG. 5. The first wireless mesh node may then inform the computer that sent the second request that the request was blocked due to the fact that the requested data is associated with the bad rating or reputation.

Note that the second request could have been for the same data that was requested in the first request and that each of the mesh nodes that passed the response associated with the first request response should have stored the rating in a respective cache memory. Because of this, any of the mesh nodes that passed the response can identify ratings associated with subsequent requests for the same data and block those subsequent requests without passing a subsequent request to another computing device. As such, the caching of rating information at different respective mesh nodes according to the present disclosure can reduce traffic in a wireless mesh network as part of a load balancing function.

When determination step 540 identifies that the request is not associated with a bad reputation, the request may be sent to other computing devices. Here again the request could be passed to a security computer for evaluation. Alternatively, a processor at the first mesh node may identify that the requested data is associated with a good reputation and the request message could be passed to a computer that provides the requested data. In such an instance, data included in the request message may be modified to include information that informs other mesh nodes or a firewall that the request is associated with a data source that has a good reputation. Because of this methods consistent with the present disclosure may also prevent security computers from receiving excessive communication traffic and from performing security tasks redundantly. In such an instance, subsequent requests for good data may be sent to an external computer without sending that subsequent request to the security computer. After step 550 or after step 560 of FIG. 5, program flow may move to step 570, where the first wireless access node continues handling network traffic.

Figure 6:
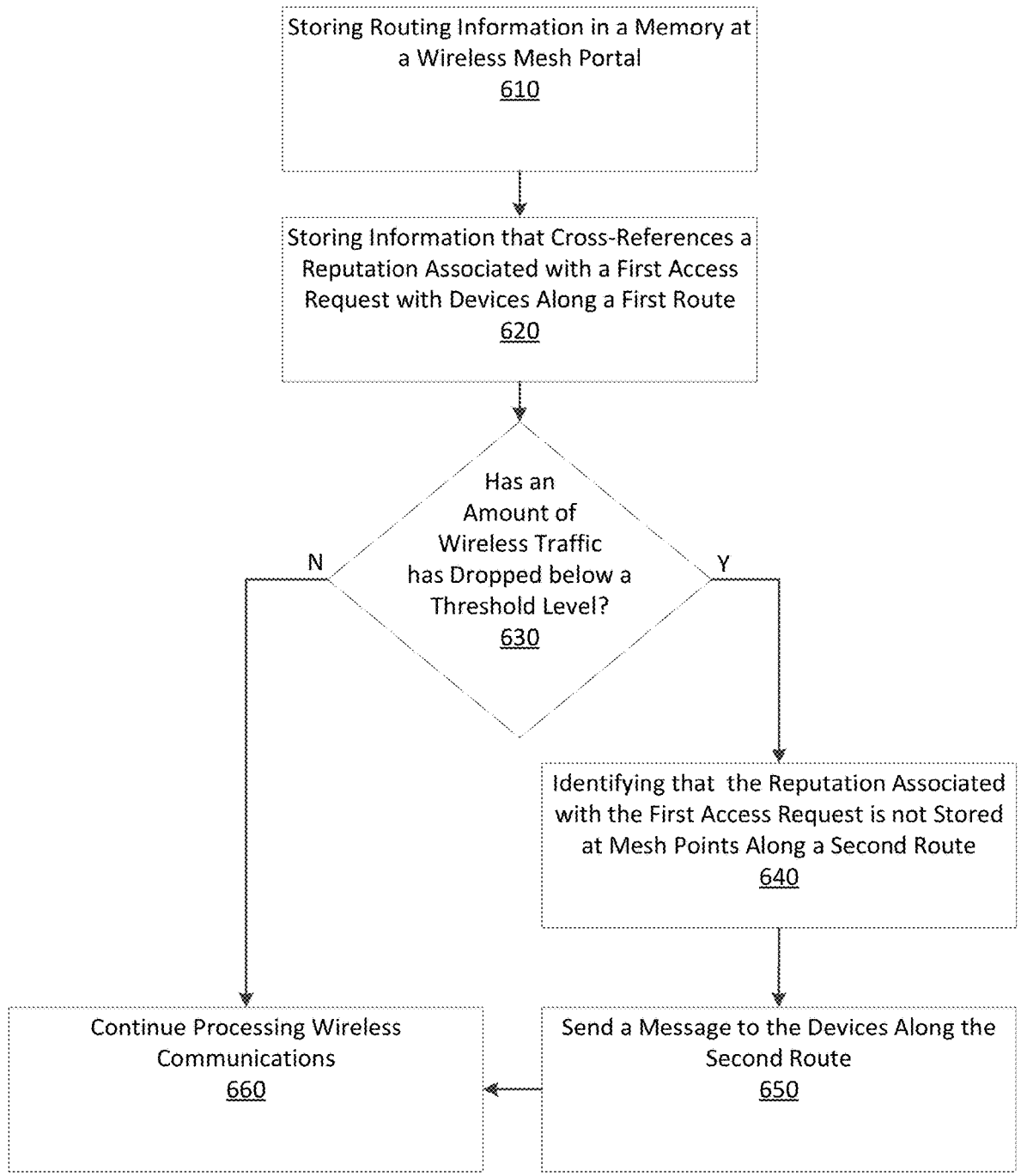
FIG. 6 illustrates a series of steps that may be performed by a wireless mesh portal to share rating information associated with access requests with wireless mesh points.

FIG. 6 illustrates a series of steps that may be performed by a wireless mesh portal to share rating information associated with access requests with wireless mesh points. FIG. 6 begins with step 610 where a processor at the mesh portal stores routing information in memory for later access. The routing information stored in step 610 may include information that identifies each and every mesh point along various different routes in a wireless mesh network. For example, mesh portal 140 of FIG. 1 may store information that identifies a first communication route that communicatively couples mesh point 170 with mesh point 150 and with mesh portal 140, that identifies a second communication route that couples mesh point 180 with mesh point 150 and mesh point 180, and that identifies a third communication route that couples mesh point 190 with mesh point 160 and with mesh portal 140. The information stored in step 610 may be stored in a routing table like the wireless mesh routing table (table 2) illustrated below. Note that table 2 cross-references wireless mesh devices that reside along one of four different routes that may communicatively couple computing devices to a wireless mesh portal directly or via one or more wireless mesh points.

Table 2 includes a first route (route 1) that consists of mesh portal 140, mesh point 150 and mesh point 170, a second route that consists of mesh portal 140, mesh point 160, and mesh point 190, a third route that consists of mesh portal 140, mesh point 150 and mesh point 180, and a fourth route that consists of mesh portal 140.

TABLE 2

Wireless Mesh Routing Table

|  | Base Node | Second Node | Third Node |
| --- | --- | --- | --- |
| Route 1 | Mesh Portal 140 | Mesh Point 150 | Mesh Point 170 |
| Route 2 | Mesh Portal 140 | Mesh Point 160 | Mesh Point 190 |
| Route 3 | Mesh Portal 140 | Mesh Point 150 | Mesh Point 180 |
| Route 4 | Mesh Portal 140 |  |  |

The assignment of time-to-live values for different mesh nodes in a mesh network may be assigned according to any preference or technical constraint. Since a cache at a wireless mesh point may store entries associated with requests from computing devices associated with several different wireless communication pathways or routes, a mesh point may have received a greater number of data access requests than any mesh point in a mesh network. For example, mesh portal 140 of FIG. 1 may receive requests that traversed each of the routes 1-4 included in table 2. Note that mesh portal 140 may receive requests from computing device 100A along route 4 of table 2, from computing device 100B along route 1 of table 2, and from computing device 100C along route 2. Because of this, a cache memory 145 of mesh portal 140 may fill faster than cache memories 155, 165, 175, and 195 of mesh portals 150, 160, 170, or 190. For this reason, time-to-live times assigned to mesh portal 140 may be less than time-to-live times associated with any mesh point in a wireless mesh network. Because of this, time-to-live times associated with a mesh portal may be inversely proportional to a number of possible routes when wireless mesh traffic is evenly distributed between a set of routes. For example, a time-to-live time for entries in the cache of a mesh portal in a particular wireless mesh network may be $\frac{1}{4}^{th}$ an amount of a time-to-live time assigned to the mesh points in that particular network when that particular network includes 4 possible routes.

Step 620 of FIG. 2 is a step where information that cross-references a reputation associated with a first access request is stored in a cache memory of mesh portal 140. In an instance where this access request was transferred along route 1 of table 2, each cache memory of each mesh device (mesh portal 140, mesh point 150, and mesh point 170) could store reputation information associated with a URL included in the first access request. Here again this reputation information could be stored in a table, such as the previously discussed table 1. In such an instance, however, table 1 could include an additional column that identifies the route along which this first access request passed. Next in determination step 630, mesh portal 140 may identify that an amount of communication traffic through the mesh network has dropped to or below a threshold level, when no, program flow may move to step 660 where mesh portal continues processing wireless communications. When determination step 630 identifies that wireless traffic has dropped below a threshold level, program flow may move to step 640 that identifies that the reputation associated with the first access request is not stored a mesh point along a second route. For example, mesh portal 140 of FIG. 1 could access information store in memory to identify that mesh points 160 and 190 do not currently store the reputation associated with the first access request in step 640 of FIG. 6. After mesh portal 140 identifies that mesh points along this second route have not stored the reputation information associated with the first access request, mesh portal 140 may send a message along route 2 of table 2 that will cause mesh point 160 and 190 to store the reputation information associated with the first access point. While under normal circumstances, when network traffic is above a threshold level, methods consistent with the present disclosure may update information stored in respective caches at respective mesh devices using normal response messages (without increasing a number of wireless communications). Mesh portals consistent with the present disclosure may also increase an amount of wireless network traffic to actively send data to mesh nodes that are known not to store reputation information associated with content that was requested by devices via a different wireless communication pathway or route when mesh communication traffic is low. As such, methods consistent with the present disclosure both can share information between mesh devices passively using standard response messages or actively using additional methods depending on current measures of wireless traffic at a wireless mesh network. Measures of wireless traffic may be identified by counting a number of wireless messages received by a mesh portal over a period of time or may be identified by identifying a number of bytes transferred over the wireless network over the period of time.

Figure 7:
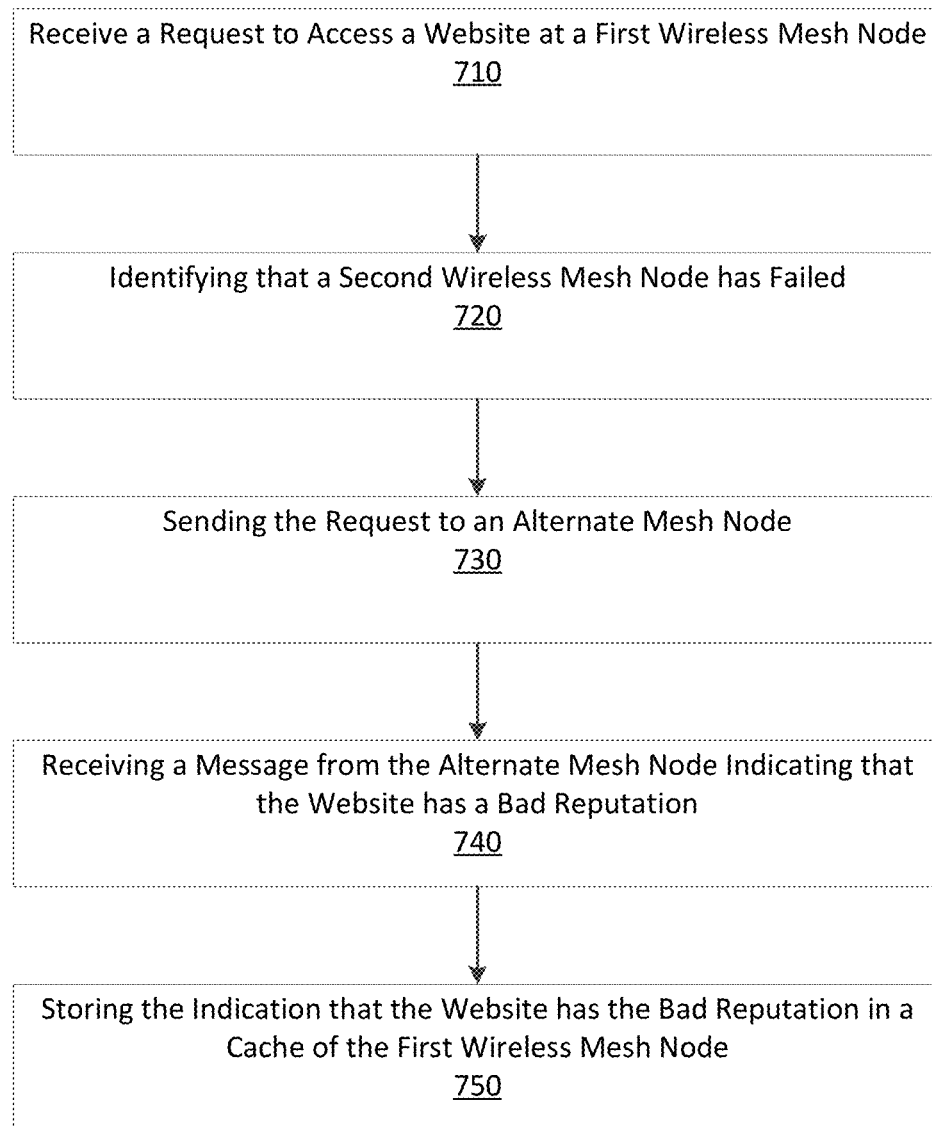
FIG. 7 illustrates a series of steps that may be performed at a mesh node when another mesh node in a set of mesh nodes has failed.

FIG. 7 illustrates a series of steps that may be performed at a mesh node when another mesh node in a set of mesh nodes has failed. Step 710 of FIG. 7 is a step where a request to access a website is received at a first wireless mesh node. Next the first wireless mesh node may identify that a second wireless mesh node has failed in step 720. The first wireless mesh node may then send the request to an alternate mesh node in step 730 of FIG. 3. After step 730, the first wireless mesh node may receive a message from the alternate mesh node in step 740 of FIG. 7 that indicates that the request is associated with a bad reputation. At the time the first mesh node received this message, a cache memory at the first wireless mesh node may not store information regarding a rating or reputation of the website access request of step 710 of FIG. 7. At this time, however, a cache memory of the alternate mesh node may store information that identifies a rating or reputation associated with the website access request. In an instance when the alternate mesh node identifies that the rating stored in its cache indicates that the website is associated with a bad reputation, the alternate mesh node machine may block the access request and may send a message back to the first mesh node that identifies that the access request was based on the bad reputation. Next, the message sent from the alternate mesh node may be received at the first mesh node in step 740 and the first mesh node may store an indication of the bad reputation in a cache memory of the first mesh node in step 750 of FIG. 7. While not illustrated in FIG. 7, the first wireless mesh node may then send a message back to a computer that originally sent the access request of step 710.

The steps of FIG. 7 illustrate that all caches of all mesh nodes in a large wireless mesh network may not store identical information. For example, the first mesh node may not have been a mesh node that previously forwarded an access request that identified the website requested in step 710. In such an instance, a previous request to access this same website may have been passed through a plurality of different mesh nodes that include the alternate mesh node. Furthermore, cache memories of each of those different mesh nodes may store information identifying the bad reputation of the website requested in step 710 of FIG. 1.

In certain instances, an application program executed by a computing device may also store reputation information of data accessible (e.g. websites, files, computer name/address, or domains) via a computer network. For example, a user computing device may store data that identifies previous requests made by the user computing device to access links associated with a bad reputation. Program code operational at this computing device could block any access request from the computing device without having to send that request to a wireless access point. Such a set of program code at the mobile device could reduce a number of communications passing through the wireless network by preventing bad access requests from being redundantly sent from a computing device.

In an instance when the computing device is mobile device is moved from one physical location to another in a wireless mesh network at a primary location (e.g. at the San Francisco Office) or at a another physical location (e.g. at the Los Angeles Office), requests from the mobile device may pass through different sets of wireless mesh nodes depending on a number of factors that include relative device locations, relative signal strengths, or an operational status of devices in a wireless mesh network. A redundant request sent from the mobile device to a website with a bad reputation if sent from the mobile device may traverse multiple hops in the wireless mesh network before an indication of the bad reputation were passed back to the mobile device. Program code operational at a mobile device may not only prevent such redundant requests for the same bad content from being sent from the mobile device as this program code could identify how many times the mobile device attempted to request the bad content. This program code could also be configured to provide a warning message to a user or may be configured to send messages regarding these redundant requests to a system administrator. For example a message may be sent to an administrator when more than a threshold number of redundant requests for bad data are sent from a mobile device. In such an instance, the user administrator may identify that this mobile device may have been compromised by malware and that device could then be quarantined from a network. This quarantining may include blocking that computer from accessing the network until that particular mobile device was scanned for viruses or otherwise analyzed.

Figure 8:
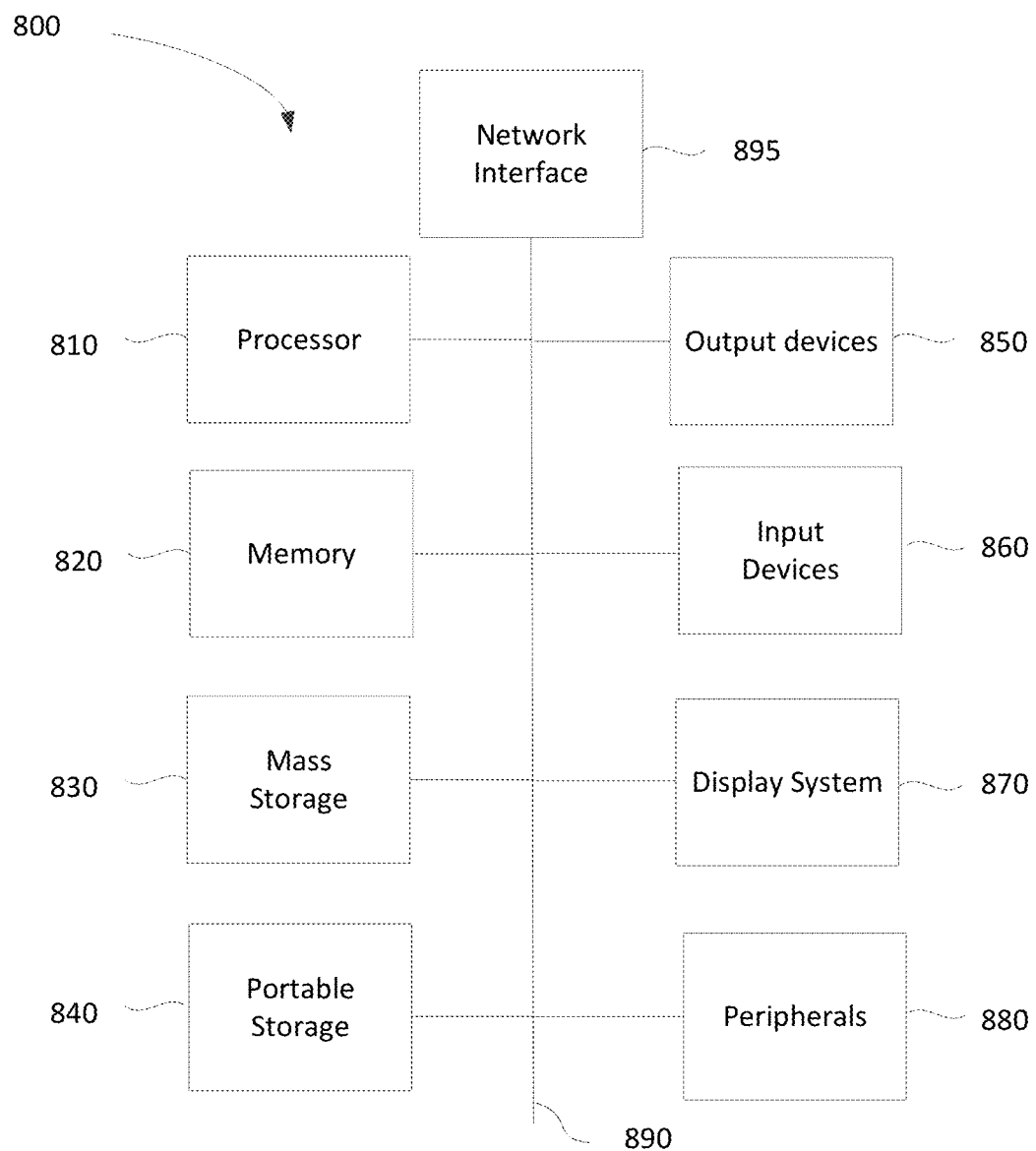
FIG. 8 illustrates a computing system that may be used to implement an embodiment of the present invention.

FIG. 8 illustrates a computing system that may be used to implement an embodiment of the present invention. The computing system 800 of FIG. 8 includes one or more processors 810 and main memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, peripheral devices 880, and network interface 895.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a FLASH memory, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD), a plasma display, an organic light-emitting diode (OLED) display, an electronic ink display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem or a router.

Network interface 895 may include any form of computer interface of a computer, whether that be a wired network or a wireless interface. As such, network interface 895 may be an Ethernet network interface, a BlueTooth™ wireless interface, an 802.11 interface, or a cellular phone interface.

The components contained in the computer system 800 of FIG. 8 may be those typically found in computer systems that may be suitable for use with embodiments of the present invention and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 800 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for preventing access to undesired content, the method comprising:
    receiving a query associated with accessing a website at a first wireless mesh node;
    sending a message that identifies the website to a security computer;
    storing information that identifies a rating of the website at a memory of the first wireless mesh node after receiving the rating information from the security computer, the rating information stored as part of a first set of rating information;
    sending the rating information to a second wireless mesh node that stores the rating information at a memory of the second wireless mesh node, wherein the first and the second wireless mesh nodes are associated with a first route at a wireless mesh network;
    identifying additional rating information that belongs to a second set of rating information that is not associated with the first route at the wireless mesh network; and
    sending the second set of rating information to the second wireless mesh node based on the second set of rating information not being associated with the first route, wherein the second set of rating information is stored in the memory of the second wireless mesh node.

2. The method of claim 1, further comprising receiving information at the first wireless mesh node associated with setting a time-to-live time that identifies how long the rating information will be stored in the memory of the first wireless mesh node.

3. The method of claim 2, wherein a time-to-live time for storing the rating information at the memory of the second wireless mesh node is different than the time-to-live time that identifies how long the rating information will be stored in the memory of the first wireless mesh node.

4. The method of claim 2, further comprising deleting the rating information after the time-to-live time has transpired.

5. The method of claim 1, further comprising identifying that a measure of communication traffic has reduced below a threshold level, wherein the sending of the second set of rating information to the second wireless mesh node is also based on the identification that the measure of communication traffic has reduced below the threshold level.

6. The method of claim 1, further comprising receiving a request to access the website and blocking the request to access the website based on the rating information stored in the memory of the first wireless mesh node.

7. A non-transitory computer readable storage medium having embodied thereon a program executable by a processor to implement a method for preventing access to undesired content, the method comprising:
    receiving a query associated with accessing a website at a first wireless mesh node;
    sending a message that identifies the website to a security computer;
    storing information that identifies a rating of the website at a memory of the first wireless mesh node after receiving the rating information from the security computer, the rating information stored as part of a first set of rating information;
    sending the rating information to a second wireless mesh node that stores the rating information at a memory of the second wireless mesh node, wherein the first and the second wireless mesh nodes are associated with a first route at a wireless mesh network;
identifying additional rating information that belongs to a second set of rating information that is not associated with the first route at the wireless mesh network; and
sending the second set of rating information to the second wireless mesh node based on the second set of rating information not being associated with the first route, wherein the second set of rating information is stored in the memory of the second wireless mesh node.

8. The non-transitory computer readable storage medium of claim 7, the program further executable to receive information at the first wireless mesh node associated with setting a time-to-live time that identifies how long the rating information will be stored in the memory of the first wireless mesh node.

9. The non-transitory computer readable storage medium of claim 8, wherein a time-to-live time for storing the rating information at the memory of the second wireless mesh node is different than the time-to-live time that identifies how long the rating information will be stored in the memory of the first wireless mesh node.

10. The non-transitory computer readable storage medium of claim 9, the program further executable to delete the rating information after the time-to-live time has transpired.

11. The non-transitory computer readable storage medium of claim 8, the program further executable to identify that a measure of communication traffic has reduced below a threshold level, wherein the sending of the second set of rating information to the second wireless mesh node is also based on the identification that the measure of communication traffic has reduced below the threshold level.

12. The non-transitory computer readable storage medium of claim 8, the program further executable to receive a request to access the website and blocking the request to access the website based on the rating information stored in the memory of the first wireless mesh node.

13. A system for preventing access to undesired content, the system comprising:
a first wireless mesh node that receives a query associated with accessing a website;
a security computer that receives a message sent from the first wireless mesh node, wherein the security computer sends information that identifies a rating of the website to the first wireless mesh node that stores the rating information as part of a first set of rating information in a memory of the first wireless mesh node; and
a second wireless mesh node that:
receives the rating information from the first wireless mesh node and that stores the rating information in a memory of the second wireless mesh node, wherein the first and the second wireless mesh nodes are associated with a first route at a wireless mesh network,
receives additional rating information that belongs to a second set of rating information that is not associated with the first route at the wireless mesh network, the second set of rating information sent to the second wireless mesh node based on the second set of rating information not being associated with the first route, and
stores the second set of rating information in the memory of the second wireless mesh node.

14. The system of claim 13, wherein information is received at the first wireless mesh node associated with setting a time-to-live time that identifies how long the rating information will be stored in the memory of the first wireless mesh node.

15. The system of claim 14, wherein a time-to-live time for storing the rating information at the memory of the second wireless mesh node is different than the time-to-live time that identifies how long the rating information will be stored in the memory of the first wireless mesh node.

16. The system of claim 14, further comprising deleting the rating information after the time-to-live time has transpired.

17. The system of claim 13, further comprising a third wireless mesh node that receives a query to access a second website, wherein the third wireless mesh node receives a third set of rating information and the third set of rating information is stored in a memory of the third wireless mesh node.

18. The system of claim 17, wherein the first and the second wireless mesh nodes are associated with a first route that includes a first set of wireless mesh nodes and the first and the third wireless mesh nodes are associated with a second route that includes a second set of wireless mesh nodes.

19. The system of claim 18, further comprising the first set of wireless mesh nodes, the second set of wireless mesh nodes, and a third set of wireless mesh nodes, wherein each of the first, the second, and the third set of wireless mesh nodes are associated with a different wireless route.

20. The system of claim 13, wherein the first wireless mesh node is a wireless mesh portal and the second wireless mesh node is a wireless mesh point and the system further comprising a second wireless mesh node that communicates with a different set of wireless mesh points that do not include the wireless mesh point.

* * * * *